United States Patent
Hess et al.

(10) Patent No.: US 9,657,766 B2
(45) Date of Patent: May 23, 2017

(54) TOOLS AND RATCHET LOCKING MECHANISMS FOR THREADED FASTENERS

(71) Applicant: Enduralock, LLC, Overland Park, KS (US)

(72) Inventors: Harold Hess, Leawood, KS (US); Logan Thorup, Overland Park, KS (US)

(73) Assignee: ENDURALOCK, LLC, Overland Park, KS (US)

( * ) Notice: Subject to any disclaimer, the term of this patent is extended or adjusted under 35 U.S.C. 154(b) by 49 days.

(21) Appl. No.: 14/460,037

(22) Filed: Aug. 14, 2014

(65) Prior Publication Data

US 2014/0356097 A1 Dec. 4, 2014

Related U.S. Application Data

(60) Continuation-in-part of application No. 14/319,453, filed on Jun. 30, 2014, now Pat. No. 9,255,600, which
(Continued)

(51) Int. Cl.
*F16B 39/12* (2006.01)
*F16B 39/24* (2006.01)
*F16B 39/32* (2006.01)

(52) U.S. Cl.
CPC .............. *F16B 39/12* (2013.01); *F16B 39/24* (2013.01); *F16B 39/32* (2013.01)

(58) Field of Classification Search
CPC ........................................ F16B 39/32
(Continued)

(56) References Cited

U.S. PATENT DOCUMENTS 286,498 A * 10/1883 Steele ..................... F16B 39/32
411/114
328,244 A * 10/1885 Morningstar .......... F16B 39/32
411/114
(Continued)

FOREIGN PATENT DOCUMENTS

JP    07217634    8/1995
JP    08-004743    1/1996
(Continued)

OTHER PUBLICATIONS

International Preliminary Report on Patentability—International Application No. PCT/US2014/051006 dated Feb. 16, 2016.
(Continued)

*Primary Examiner* — Flemming Saether
(74) *Attorney, Agent, or Firm* — Armstrong Teasdale LLP (57) ABSTRACT

A fastening device having a fastener with a head portion and an elongated threaded body portion extending axially from the head portion. The fastening device also includes a lock washer and a threaded lock nut for rotatably mating with the fastener. The lock washer has a lower surface with a plurality of ratchet teeth extending therefrom. The lock washer is configured to couple to the fastener for axial movement but is fixed rotationally. The threaded lock nut has an upper surface defining at least one pawl arm. The pawl arm includes at least one pawl tooth for engagement with at least one of the plurality of ratchet teeth, and a flange extending radially outward from the pawl arm.

18 Claims, 8 Drawing Sheets

Related U.S. Application Data is a division of application No. 13/068,171, filed on May 4, 2011, now Pat. No. 8,784,027.

(60) Provisional application No. 61/891,002, filed on Oct. 15, 2013, provisional application No. 61/866,332, filed on Aug. 15, 2013, provisional application No. 61/403,332, filed on Sep. 14, 2010.

(58) Field of Classification Search
USPC .................................................. 411/326–329
See application file for complete search history.

(56) References Cited

U.S. PATENT DOCUMENTS

| | | | | |
|---|---|---|---|---|
| 506,596 | A | * | 10/1893 | Kirkpatrick ............. F16B 39/32 411/329 |
| 839,281 | A | * | 12/1906 | Fluke ...................... F16B 39/32 411/329 |
| 896,901 | A | * | 8/1908 | Dubrow .................. F16B 39/32 411/328 |
| 955,054 | A | | 4/1910 | Darby |
| 961,371 | A | | 6/1910 | Posey |
| 1,140,974 | A | | 5/1915 | Formby |
| 1,221,194 | A | * | 4/1917 | Lang ...................... F16B 39/32 411/329 |
| 1,225,626 | A | | 5/1917 | Hannon |
| 1,246,353 | A | | 11/1917 | Thigpen |
| 1,249,336 | A | | 12/1917 | Cook |
| 1,289,710 | A | | 12/1918 | Ervin |
| 1,337,424 | A | | 4/1920 | Word |
| 1,344,845 | A | * | 6/1920 | Anderson ............... F16B 39/32 411/114 |
| 1,367,072 | A | * | 2/1921 | Miyagi ................... F16B 39/32 411/331 |
| 1,377,196 | A | * | 5/1921 | Gillespie ................ F16B 39/32 411/198 |
| 1,403,902 | A | | 1/1922 | Fields |
| 1,467,907 | A | * | 9/1923 | Miyagi ................... F16B 39/32 411/327 |
| 1,526,914 | A | | 2/1925 | Kibler |
| 1,611,408 | A | * | 12/1926 | Bowers ................... F16B 39/32 411/198 |
| 1,868,007 | A | * | 7/1932 | Frelin ..................... F16B 39/32 411/326 |
| 2,018,574 | A | | 10/1935 | Richter |
| 2,141,701 | A | | 12/1938 | Uherkovich |
| 2,398,965 | A | | 4/1946 | Rounds |
| 5,190,423 | A | | 3/1993 | Ewing |
| 5,460,468 | A | | 10/1995 | DiStacio |
| 5,538,378 | A | | 7/1996 | Van Der Drift |
| 5,575,602 | A | | 11/1996 | Savage et al. |
| 5,606,753 | A | * | 3/1997 | Hashimoto ............. F16B 39/32 411/120 |
| 5,713,708 | A | | 2/1998 | Van derDrift et al. |
| 5,735,853 | A | | 4/1998 | Olerud |
| 5,951,224 | A | | 9/1999 | DiStasio |
| 6,010,289 | A | | 1/2000 | DiStasio et al. |
| 6,082,941 | A | | 7/2000 | Dupont et al. |
| 6,139,550 | A | | 10/2000 | Michelson |
| 6,258,089 | B1 | | 7/2001 | Campbell et al. |
| 6,261,291 | B1 | | 7/2001 | Talaber et al. |
| 6,361,257 | B1 | | 3/2002 | Grant |
| 6,383,186 | B1 | | 5/2002 | Michelson |
| 6,398,783 | B1 | | 6/2002 | Michelson |
| 6,413,259 | B1 | | 7/2002 | Lyons et al. |
| 6,434,792 | B1 | | 8/2002 | Williamson |
| 6,602,255 | B1 | | 8/2003 | Campbell et al. |
| 6,626,907 | B2 | | 9/2003 | Campbell et al. |
| 6,695,846 | B2 | | 2/2004 | Richelsoph et al. |
| 6,755,833 | B1 | | 6/2004 | Paul et al. |
| 6,935,822 | B2 | | 8/2005 | Hartmann et al. |
| 6,976,817 | B1 | | 12/2005 | Grainger |
| 7,189,044 | B2 | | 3/2007 | Ball |
| 7,270,509 | B2 | | 9/2007 | Disantis et al. |
| 7,318,825 | B2 | | 1/2008 | Butler et al. |
| 7,374,495 | B2 | | 5/2008 | Ball |
| 7,621,943 | B2 | | 11/2009 | Michelson |
| 7,763,056 | B2 | | 7/2010 | Dalton |
| 7,857,839 | B2 | | 12/2010 | Duong et al. |
| 7,887,547 | B2 | | 2/2011 | Campbell et al. |
| 7,909,859 | B2 | | 3/2011 | Mosca et al. |
| 7,955,037 | B2 | | 6/2011 | Disantis et al. |
| 8,123,788 | B2 | | 2/2012 | Michelson |
| 8,262,711 | B2 | | 9/2012 | Hess |
| 8,366,365 | B2 | | 2/2013 | Disantis et al. |
| 2005/0207865 | A1 | | 9/2005 | Disantis et al. |
| 2005/0209599 | A1 | | 9/2005 | Brunsvold |
| 2006/0015104 | A1 | | 1/2006 | Dalton |
| 2009/0060682 | A1 | | 3/2009 | Yeh et al. |
| 2009/0192553 | A1 | | 7/2009 | Maguire et al. |
| 2010/0121383 | A1 | | 5/2010 | Stanaford et al. |
| 2012/0063864 | A1 | | 3/2012 | Hess |

FOREIGN PATENT DOCUMENTS

| | | |
|---|---|---|
| KR | 200241791 | 10/2001 |
| KR | 20100863200 | 10/2008 |
| KR | 10-2011-0099247 | 9/2011 |

OTHER PUBLICATIONS

PCT International Search Report and Written Oinion dated Nov. 26, 2014 issued on corresponding PCT International Application No. PCT/US2014/051006.
International Preliminary Report (PCT/IB/373) and Written Opinion on Patentability (PCT/ISA/237) in corresponding International Application PCT/US2011/051189, mailed Mar. 19, 2013.
TineLok: Overview, www.tinelok.com (2013).
TineLok, The Revolutionary Vibration-Proof Fastener System, www.tinelok.com (2013).
Written Opinion with International Search Report from Application No. PCT/US2011/051189, mailed Jun. 28, 2012.

* cited by examiner

TOOLS AND RATCHET LOCKING MECHANISMS FOR THREADED FASTENERS

CROSS-REFERENCE TO RELATED APPLICATIONS

This application claims priority to U.S. Provisional Patent Application No. 61/891,002 filed Oct. 15, 2013 and U.S. Provisional Patent Application No. 61/866,332 filed Aug. 15, 2013, each of which is incorporated herein by reference in its entirety. This application is also a continuation-in-part of U.S. patent application Ser. No. 14/319,453 filed on Jun. 30, 2014, which is a divisional of U.S. patent application Ser. No. 13/068,171 filed on May 4, 2011 (U.S. Pat. No. 8,784,027), which claims priority to U.S. Provisional Patent Application No. 61/403,332 filed Sep. 14, 2010, each of which is incorporated herein by reference in its entirety.

BACKGROUND OF THE INVENTION

1. Field of the Invention

The subject invention is directed generally to fasteners, and more particularly, to a ratcheting locking mechanism for threaded fasteners.

2. Background of the Related Art

Threaded fasteners designed to lock male and female threaded components together are well known in the art and include, for example, lock washers, blind thread bores filled with resilient inserts and screw thread profiles that deform when tightened. Fasteners with self-locking accessories such as cotter pins and lock wires are also known. Other examples of self-locking threaded fasteners are disclosed in U.S. Pat. No. 5,460,468 to DiStacio on Oct. 24, 1995; U.S. Pat. No. 5,538,378 to Van der Drift on Jul. 23, 1996; and U.S. Pat. No. 5,713,708 to Van der Drift et al. on Feb. 3, 1998, each of which is incorporated herein by reference.

In addition, it is known in the art to apply temporary adhesives to screw threads. Once cured, the adhesive helps prevent loosening. However, normal removal torque can break the bond for removal. Such adhesives tend to perform poorly in high temperature applications.

SUMMARY OF THE INVENTION

In one embodiment, the subject technology is directed to a fastening device having a fastener with a head portion and an elongated threaded body portion extending axially from the head portion. The fastening device also includes a lock washer and a threaded lock nut for rotatably mating with the fastener. The lock washer has a lower surface with a plurality of ratchet teeth extending therefrom. The lock washer is configured to couple to the fastener for axial movement but is fixed rotationally. The threaded lock nut has an upper surface defining at least one pawl arm. The pawl arm includes at least one pawl tooth for engagement with at least one of the plurality of ratchet teeth, and a flange extending radially outward from the pawl arm.

The threaded lock nut may include an axially extending recessed portion between a lower surface of the threaded lock nut and the pawl arm. The lock washer can have an axial aperture having at least one flat inner surface corresponding to at least one longitudinally extending flat section of the threaded body portion. The longitudinally extending flat section is configured to mate with the flat inner surface of the lock washer to rotationally fix the lock washer when the elongated threaded body portion is inserted in the axial aperture. The head portion of the fastener can be a tulip head defining a transverse channel and opposing prongs. The axial aperture of the lock washer can also include a bar, wherein the bar extends between opposing sides of the axial aperture to define two discrete axial apertures. Each axial aperture can correspond to one of the respective prongs of the tulip head. The axial aperture of the lock washer can be radially inward of the ratchet teeth. The ratchet teeth can entirely cover the lower surface of the lock washer or the lower surface of the lock washer can include a surface portion without ratchet teeth defined radially between the ratchet teeth and the axial aperture.

It is contemplated that the fastening device can also include a tool. The tool can include a distal working portion forming a tapered surface to apply a removal force to temporarily lift the pawl arm away from the ratchet teeth and unthread the threaded lock nut, and a proximal end adapted to mount to a ratchet. The tool can include an inner diameter tier and an outer diameter tier on a distal working portion. The inner diameter tier of the tool can correspond to the axially extending recessed portion for tightening the threaded lock nut during clock-wise rotation of the tool. The outer diameter tier can include a tapered ramp for applying a removal force to a surface of the flange of the pawl arm to bend the pawl arm and the at least one pawl tooth away from the ratchet teeth for disengagement during counter-clockwise rotation of the tool. The tapered ramp may be defined in a slot defined in the outer diameter tier, and/or on a circumferentially extending flange of the outer diameter tier.

In another embodiment, a fixation system for coupling a rod to bone includes an elongated bone screw fastener having, a lock washer and a threaded lock nut. The elongated bone screw fastener includes a threaded tulip head portion defining a transverse channel and opposing prongs, and an elongated threaded body portion depending from the tulip head portion. The lock washer includes opposed upper and lower surfaces with a pair of discrete axial apertures extending therebetween, and ratchet teeth. The lock washer includes a bar extending between the pair of discrete axial apertures. Each discrete axial aperture is configured to receive one of the respective prongs of the tulip head portion of the elongated bone screw fastener for axial movement of the lock washer along the prongs of the tulip head portion to secure the rod between the lock washer and the tulip head portion. The threaded lock nut is configured to rotatably mate with the threaded tulip head portion. The lock nut has opposed upper and lower surfaces. The upper surface defines at least one pawl arm. The pawl arm includes at least one pawl tooth for engagement with at least one of the ratchet teeth.

In another embodiment, a fastening device includes a lock washer with opposed upper and lower surfaces and a circumferential surface therebetween. The circumferential surface has an array of ratchet teeth extending radially outward of the circumferential surface. A tapered slot is defined between the pawl arm and the threaded lock nut. The pawl arm includes a tapered inner surface such that the tapered slot is smaller proximate the at least one pawl tooth.

The fastening device can also include a tool for tightening and removing the fastener. The tool may include at least one projection on a distal working portion. The projection can include a recessed extension configured to engage the tapered slot defined between the pawl arm and the threaded lock nut. The projection can correspond to an axially extending recessed portion defined in the threaded lock nut between the lower surface of the threaded lock nut and the pawl arm. The recessed extension can correspond to the tapered slot so that during tightening the recessed extension is in the larger portion of the tapered slot and during removal the recessed extension rotates counter-clockwise into the smaller portion of the tapered slot proximate the pawl tooth to splay the pawl arm radially outward.

It should be appreciated that the present technology can be implemented and utilized in numerous ways, including without limitation as a process, an apparatus, a system, a device, a method for applications now known and later developed. These and other unique features of the technology disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

DETAILED DESCRIPTION OF THE PREFERRED EMBODIMENTS

The present disclosure overcomes many of the prior art problems associated with threaded fasteners. In general, threaded fasteners are used to fixedly connect two or more pieces in a variety of applications such as, without limitation, with surgical implants, industrial applications, aerospace applications and building applications. Among other features and benefits, the disclosed fastening devices and systems facilitate quick and easy installation and/or removal with low torque requirements while providing a reliably vibration resistant secured tightness. The advantages, and other features of the technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

All relative descriptions herein such as upward, downward, left, right, up, down, length, height, width, thickness and the like are with reference to the Figures, and not meant in a limiting sense. Additionally, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed fastener assemblies. Additionally, the shapes and sizes of components are also exemplary and can be altered without materially affecting or limiting the disclosed technology.

Figure 1:
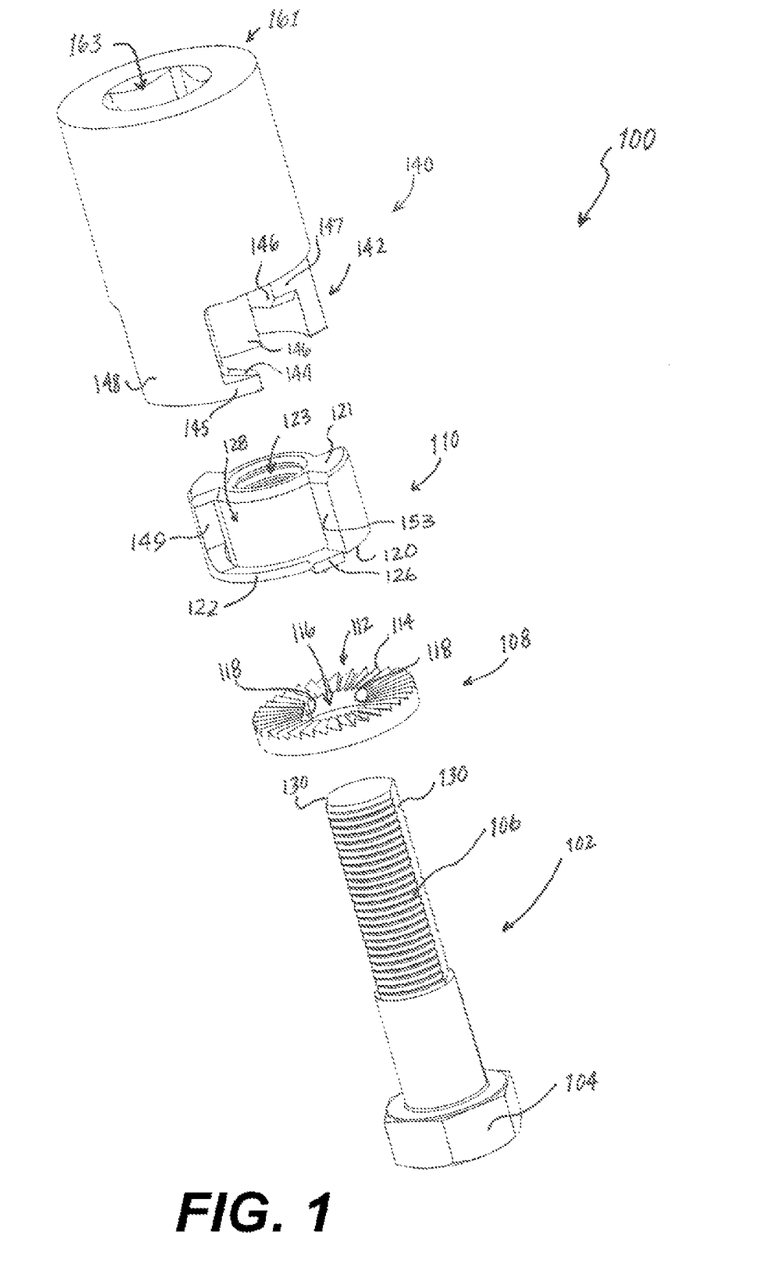
FIG. 1 is an exploded perspective view of a fastening device constructed in accordance with the subject technology, showing a fastener, a lock washer, a threaded lock nut and a tool.

As shown in FIG. 1, a fastening device constructed in accordance with a preferred embodiment of the subject invention is designated generally by reference numeral 100. Fastening device 100 includes a fastener 102 with a head portion 104 and an elongated threaded body portion 106 extending axially from head portion 104, a lock washer 108, and a threaded lock nut 110 for rotatably mating with threaded body portion 106. Lock washer 108 has a lower surface 112 with a plurality of ratchet teeth 114 that entirely cover lower surface 112 of lock washer 108. Lock washer 108 is configured to couple to threaded body portion 106 for axial movement. Lock washer 108 has an axial aperture 116 with a pair of opposing flat inner surfaces 118 corresponding to the pair of opposing longitudinally extending flat sections 130 of threaded body portion 106. Flat sections 130 mate with flat inner surfaces 118 of lock washer 108 to rotationally fix lock washer 108 when elongated threaded body portion 106 is inserted in axial aperture 116. Lock washer 108 is permitted to move axially along threaded body portion 106. Those skilled in the art will readily appreciate that the head portion 104 of fastener 102 can take any conventional form known in the art including, for example, a hexagonal head or a tulip head, as will be described below.

Figure 2:
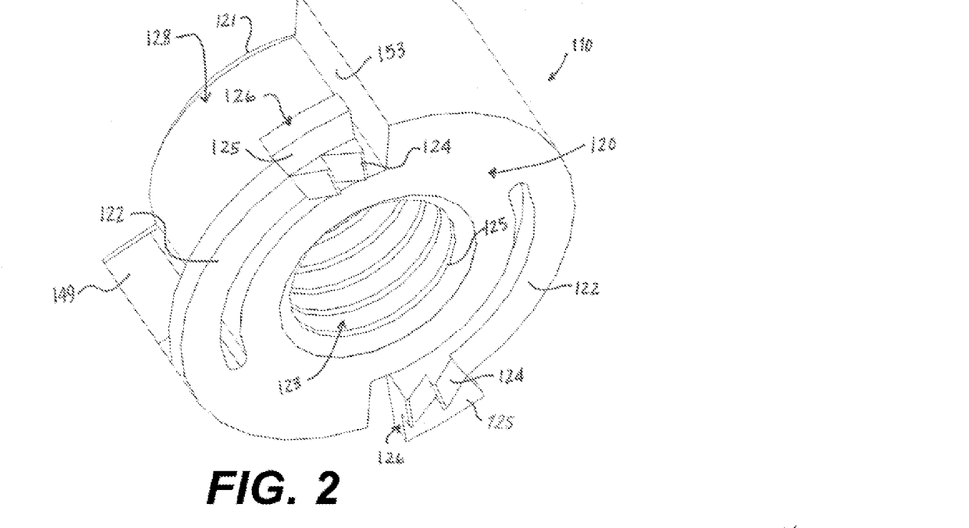
FIG. 2 is a perspective view of the threaded lock nut of FIG. 1, showing an upper surface of the threaded lock nut having opposing pawl arms.

Now with reference to FIG. 2, threaded lock nut 110 has an upper surface 120 that defines a pair of opposing pawl arms 122. Each pawl arm 122 includes a flange 126 extending radially outward from pawl arm 122 and respective pawl teeth 124 for engagement with at least one of ratchet teeth 114. Those skilled in the art will readily appreciate that while each pawl arm 122 is described herein as having a pair of pawl teeth 124, any suitable number of pawl teeth 124 can be used. Threaded lock nut 110 includes an axial aperture 123 with threads 125 defined in the circumference of aperture 123 for mating with the threads of threaded body portion 106 for axial movement along threaded body portion 106 by rotating about threaded body portion 106. Threaded lock nut 110 includes a pair of axially extending recessed portions 128. Each recessed portion 128 is defined between a lower surface 121 of threaded lock nut 110 and a respective pawl arm 122.

Figure 3A:
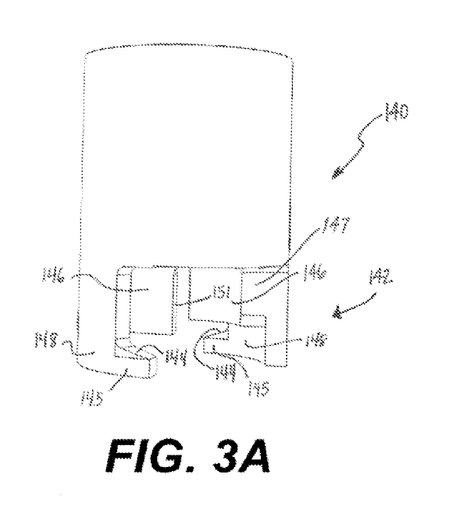
FIG. 3A is a side perspective view of the tool of FIG. 1, showing tapered ramps defined in outward extending flanges.
Figure 3B:
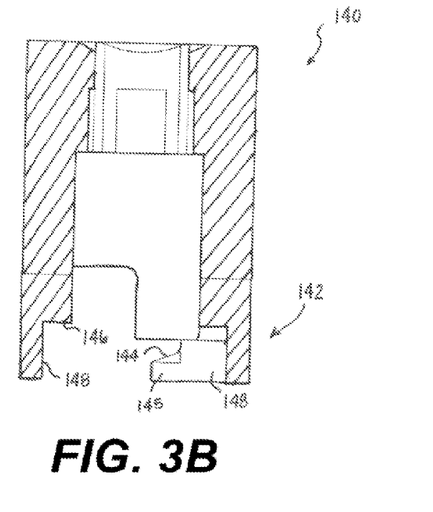
FIG. 3B is a side cross-sectional view of the tool of FIG. 1, showing inner and outer diameter tiers.

As shown in FIGS. 1, 3A and 3B, fastening device 100 includes a tool 140 for tightening and removing fastener 102. A distal working portion 142 of tool 140 includes opposing inner diameter tiers 146 and opposing outer diameter tiers 148. A proximal end 161 includes a socket 163 adapted to mount to a ratchet. Inner diameter tiers 146 of tool 140 each correspond to respective axially extending recessed portions 128 of threaded lock nut 110 for tightening threaded lock nut 110 during clockwise rotation of tool 140. During tightening, inner diameter tiers 146 of distal working portion 142 of tool 140 are positioned within their respective axially extending recessed portion 128 of lock nut 110 with outer diameter tiers 148 disposed radially outward of lock nut 110, and tool 140 is rotated clockwise. During clockwise rotation, a respective neck surface 147 of each inner diameter tier 146 contacts a respective shoulder surface 149 of lock nut 110, forcing clockwise rotation of lock nut 110 about threaded body portion 106 and axial movement toward head portion 104 to tighten fastener 102 in position.

With continued reference to FIGS. 1, 3A and 3B, outer diameter tiers 148 each include a circumferentially extending flange 145 with respective tapered ramps 144 for applying a removal force to respective upper surfaces 125 of radially outward extending flanges 126 of pawl arms 122. During removal, inner diameter tiers 146 are again positioned within their respective axially extending recessed portions 128 with outer diameter tiers 148 disposed radially outward of lock nut 110, and tool 140 is rotated counter-clockwise. During counter-clockwise rotation, each tapered ramp 144 contacts a respective upper surface 125 of each flange 126 lifting each pawl arm 122 away from ratchet teeth 114 of lock washer 108 and disengaging pawl teeth 124 from ratchet teeth 114. Once pawl arms 122 are lifted and pawl teeth 124 are disengaged, the continued counter-clockwise rotation causes a respective second neck surface 151 of each inner diameter tier 146 to contact a respective second shoulder surface 153 of lock nut 110, forcing counter-clockwise rotation of lock nut 110 about threaded body portion 106 and axial movement away from head portion 104 to remove lock nut 110.

Figure 4:
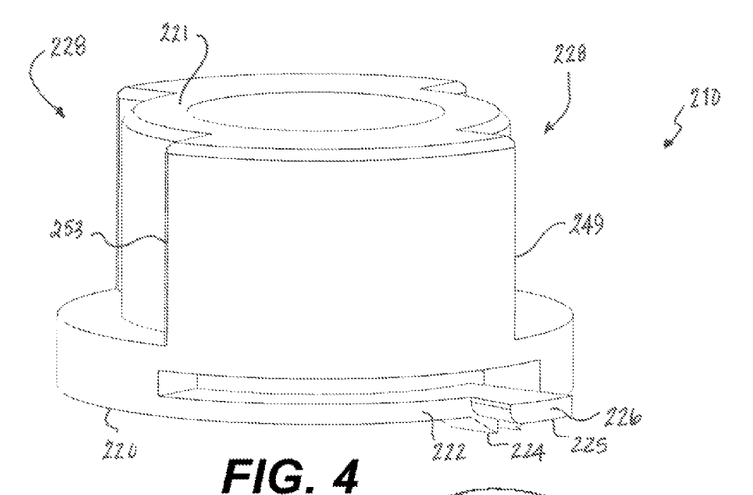
FIG. 4 is a side perspective view of another embodiment of a threaded lock nut, showing the threaded lock nut having a pair of axially extending recessed portions defined between upper and lower surfaces of the threaded lock nut.

As shown in FIG. 4, an alternative embodiment of a lock nut 210 is shown. Lock nut 210 is similar to lock nut 110, except that axially extending recessed portions 228 are defined between upper and lower surfaces 220 and 221, respectively, of threaded lock nut 210, instead of between lower surface 221 and pawl arm 222, it is contemplated that lock nut 210 can be used in conjunction with lock washer 108 and fastener 102, similar to lock nut 110, described above, but an alternative embodiment of a tool, e.g. tool 240, described below, can be used for tightening and removal.

Figure 5:
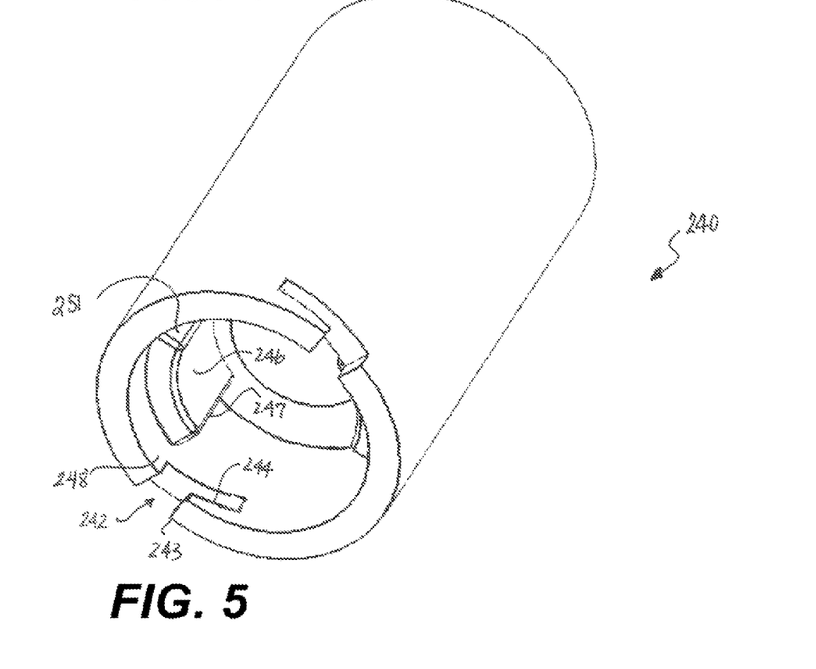
FIG. 5 is a perspective view of another embodiment of a tool constructed in accordance with the subject technology, showing tapered ramps defined in slots.

With reference now to FIGS. 4 and 5, tool 240 is shown. Tool 240 is similar to tool 140, except that tapered ramps 244 are defined in slots 242 defined in outer diameter tiers 248. While slots 242 are shown as being cut entirely through outer diameter tier 248, it is contemplated that slots 242 could be partially cut through outer diameter tier 248. For example, slots 242 could be partially cut through from the inner diameter surface side of outer diameter tier 248. Each slot 242 includes a respective slot opening 243 that corresponds to a respective flange 226 of each pawl arm 222. Tool 240 includes opposing inner diameter tiers 246 that correspond to respective axially extending recessed portions 228 of lock nut 210. During tightening, inner diameter tiers 246 of tool 240 are each positioned within their respective axially extending recessed portion 228 of lock nut 210 with outer diameter tiers 248 disposed radially outward of lock nut 210 and with each flange 226 received in a respective slot opening 243, and tool 240 is rotated clockwise. During clockwise rotation, a respective neck surface 247 of each inner diameter tier 246 contacts a respective shoulder surface 249 of lock nut 210, forcing clockwise rotation of lock nut 210 about threaded body portion 106 and axial movement toward head portion 104 to tighten fastener 102 in position.

With continued reference to FIGS. 4 and 5, during removal, inner diameter tiers 246 are again positioned within their respective axially extending recessed portions 228 with outer diameter tiers 248 disposed radially outward of lock nut 210 and with flange 226 received in slot opening 243, and tool 240 is rotated counter-clockwise. During counter-clockwise rotation, each flange 226 is free to rotate into its respective slot 242 and travel along tapered ramps 244. Tapered ramps 244 contact respective upper surfaces 225 of flanges 226 lifting each pawl arm 222 away from ratchet teeth 114 of lock washer 108 and disengaging pawl teeth 224 from ratchet teeth 114. Once pawl arms 222 are lifted and pawl teeth 224 are disengaged, the continued counter-clockwise rotation causes a respective second neck surface 251 of each inner diameter tier 246 to contact a respective second shoulder surface 253 of lock nut 210, forcing counter-clockwise rotation of lock nut 210 about threaded body portion 106 and axial movement away from head portion 104 to remove lock nut 210.

Figure 6:
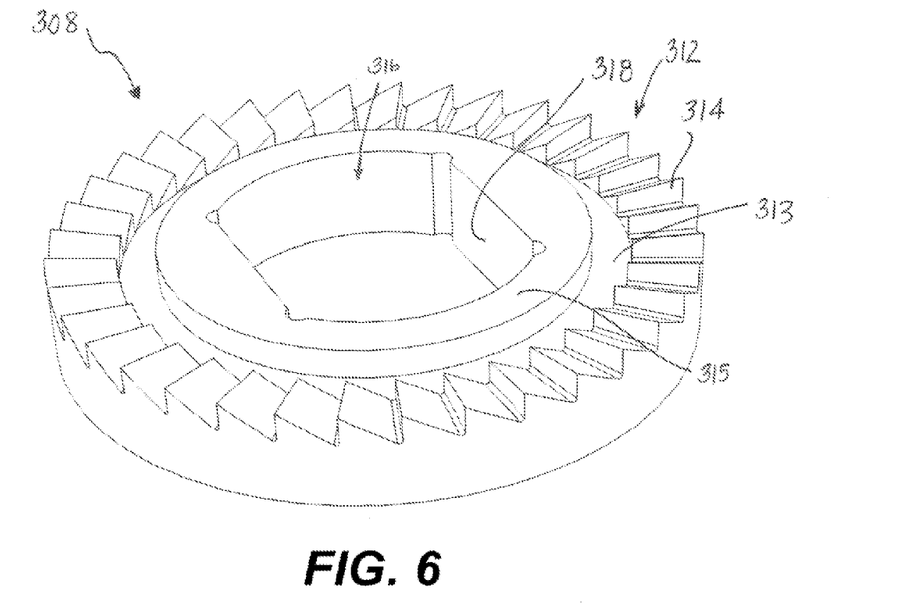
FIG. 6 is a side perspective view of another embodiment of a lock washer constructed in accordance with the subject technology, showing a portion of the lower surface of the lock washer without ratchet teeth.

With reference now to FIG. 6, an alternative embodiment of lock washer 308 is shown. Lock washer 308 is similar to lock washer 108 except that a recessed portion 313 of lower surface 312 of lock washer 308 does not include ratchet teeth 314. Lock washer 308 also includes a raised boss portion 315 defined radially between an aperture 316 and recessed portion 313 without ratchet teeth 314. It is contemplated that raised boss portion 315 can extend radially outward to abut ratchet teeth 314, or can be removed all together such that the surface is flush with recessed portion 313. It is contemplated that by not having teeth 314 extend across the entire surface of the lock washer 308, most of the clamping force is applied on raised boss portion 315 as opposed to teeth 314. This tends to allow for a greater clamping force to be applied to washer 308, as the potential for the clamping force to deform teeth 314 is reduced. Those skilled in the art will readily appreciate that recessed portion 313 tends to ease manufacturing for certain tools, for example, a dovetail cutter.

Figure 7:
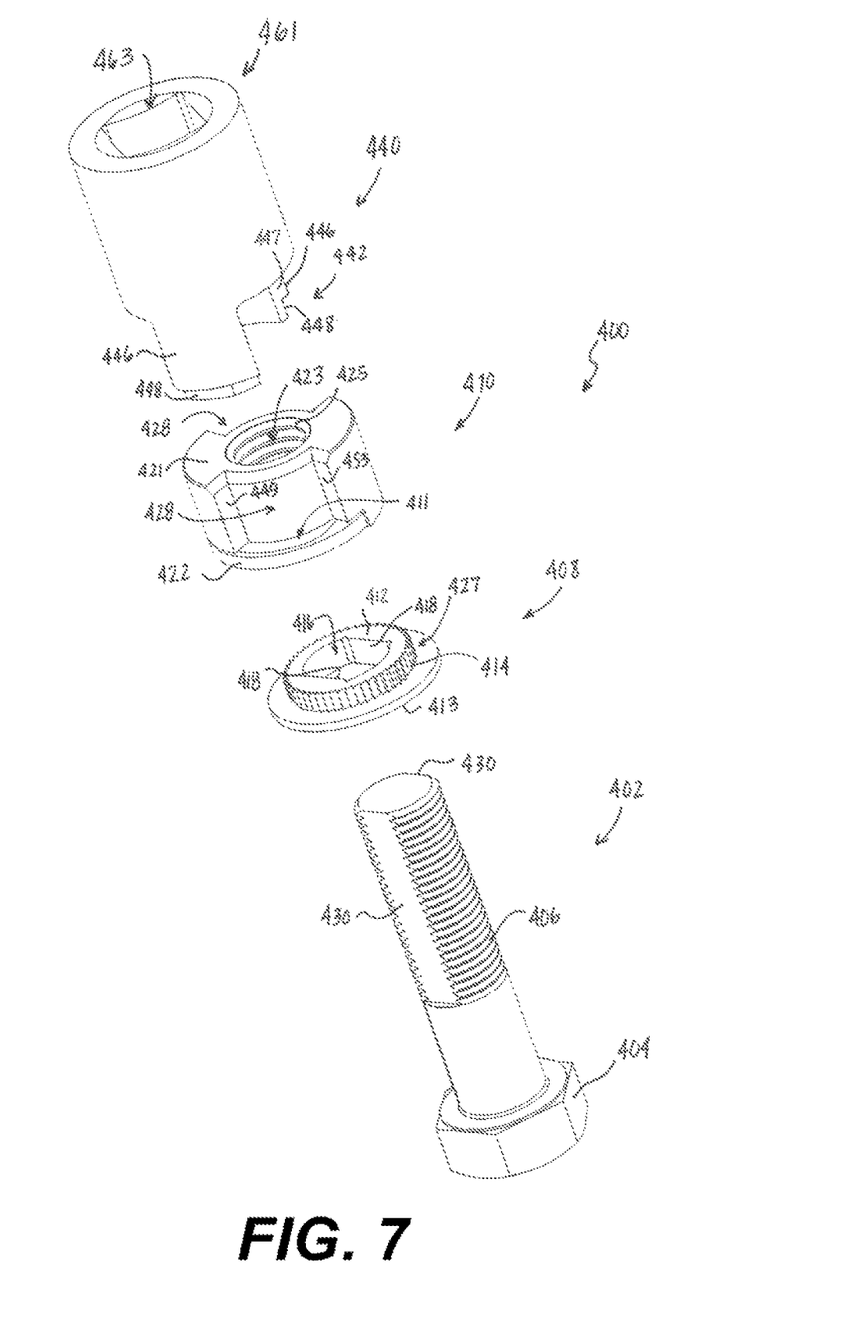
FIG. 7 is an exploded perspective view of another embodiment of a fastening device constructed in accordance with the subject technology, showing a fastener, a lock washer, a threaded lock nut and a tool.

As shown in FIG. 7, a fastening device 400 includes a fastener 402 with a head portion 404 and an elongated threaded body portion 406 extending axially from head portion 404, a lock washer 408, and a threaded lock nut 410 for rotatably mating with threaded body portion 406. Lock washer 408 has opposed upper 413 and lower surfaces 412 and a circumferential surface 427 therebetween. Circumferential surface 427 has an array of ratchet teeth 414 extending radially outward of circumferential surface 427. Lock washer 408 has an axial aperture 416 with a pair of opposing flat inner surfaces 418 corresponding to the pair of opposing longitudinally extending flat sections 430 of threaded body portion 430, similar to flat inner surfaces 118 and corresponding flat sections 130, as described above.

Figure 8:
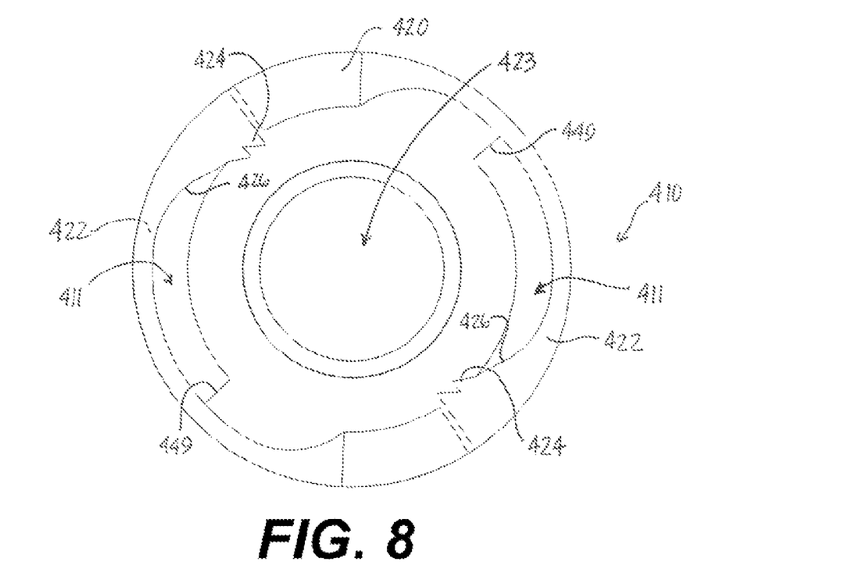
FIG. 8 is a top view of the threaded lock nut of FIG. 6, showing an upper surface of the threaded lock nut having opposing pawl arms and tapered slots.

With reference now to FIGS. 7 and 8, threaded lock nut 410 has an upper surface 420 that defines a pair of opposing pawl arms 422. Each pawl arm 422 includes a respective pair of pawl teeth 424 for engagement with at least one of ratchet teeth 414. Each pair of pawl teeth 424 extends radially inward from its respective pawl arm 422. Those skilled in the art will readily appreciate that while each pawl arm 422 is described herein as having a pair of pawl teeth 424, any suitable number of pawl teeth 424 can be used. Threaded lock nut 410 includes an axial aperture 423 with threads 425 defined in the circumference of aperture 423 for mating with the threads of threaded body portion 406, similar to aperture 123 and threads 125 described above. Threaded lock nut 410 includes axially extending recessed portions 428. Each recessed portion 428 is defined between a lower surface 421 of threaded lock nut 410 and a pawl arm 422. A tapered slot 411 is defined between each pawl arm 422 and threaded lock nut 410. Each pawl arm 422 includes a tapered inner surface 426 effectively causing the taper of tapered slot 411. The tapered slot 411 is smaller proximate pawl teeth 424.

Figure 9:
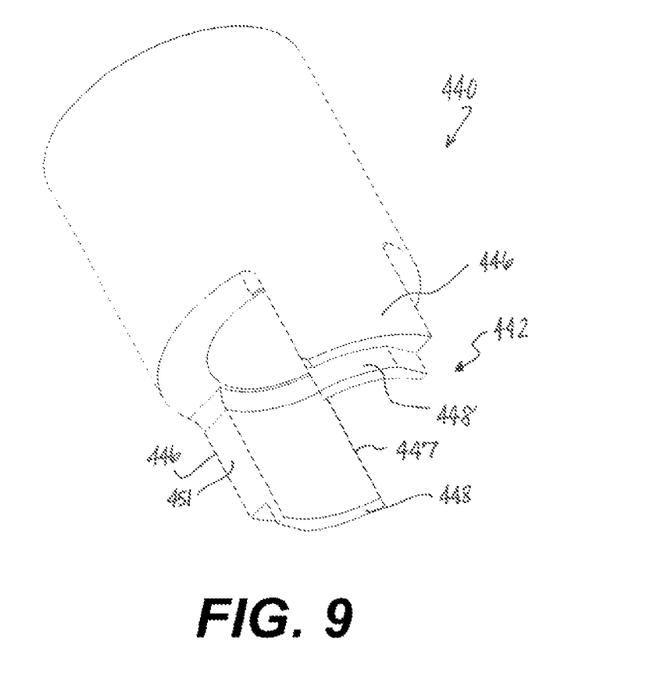
FIG. 9 is a side perspective view of the tool of FIG. 1, showing a pair of projections and recessed extensions.

As shown in FIGS. 7 and 9, fastening device 400 includes a tool 440 for tightening and removing fastener 402. Tool 440 includes a pair of projections 446 on a distal working portion 442. Each projection 446 includes a recessed extension 448 configured to engage a respective tapered slot 411. Each projection 446 corresponds to a respective axially extending recessed portion 428 of threaded lock nut. During tightening, projections 446 of tool are inserted into their respective axially extending recessed portions 428 and recessed extensions 448 extend into respective larger portions of each respective tapered slot 411. Tool 440 is then rotated clockwise. During clockwise rotation of tool 440, neck surfaces 447 of tool 440 each abut respective shoulder surfaces 449 of locking nut 410, forcing clockwise rotation of lock nut 410 about threaded body portion 406 and axial movement toward head portion 404 to tighten fastener 402 in position.

With continued reference to FIGS. 7 and 9, during removal, projections 446 of tool 440 are again inserted into their respective axially extending recessed portions 428 and recessed extensions 448 extend into respective larger portions of each respective tapered slot 411, and tool 440 is rotated counter-clockwise. During counter-clockwise rotation of tool 440, each recessed extension 448 rotates into the smaller portion of its respective tapered slot 411 against tapered surface 426 proximate pawl teeth 424 splaying the pawl arms 422 radially outward away from ratchet teeth 414 disengaging pawl teeth 424 from ratchet teeth 414. Once pawl teeth 424 are disengaged from ratchet teeth 414, the continued counter-clockwise rotation causes respective a second neck surface 451 of each projection 446 to contact a respective second shoulder surface 453 of lock nut 410, forcing counter-clockwise rotation of lock nut 410 about threaded body portion 406 and axial movement away from head portion 404 to remove lock nut 410. It is contemplated that since lock washer 408 is recessed within lock nut 410, a simple retaining clip may be used to retain lock washer 408 within lock nut 410 to make it one assembly.

Figure 10:
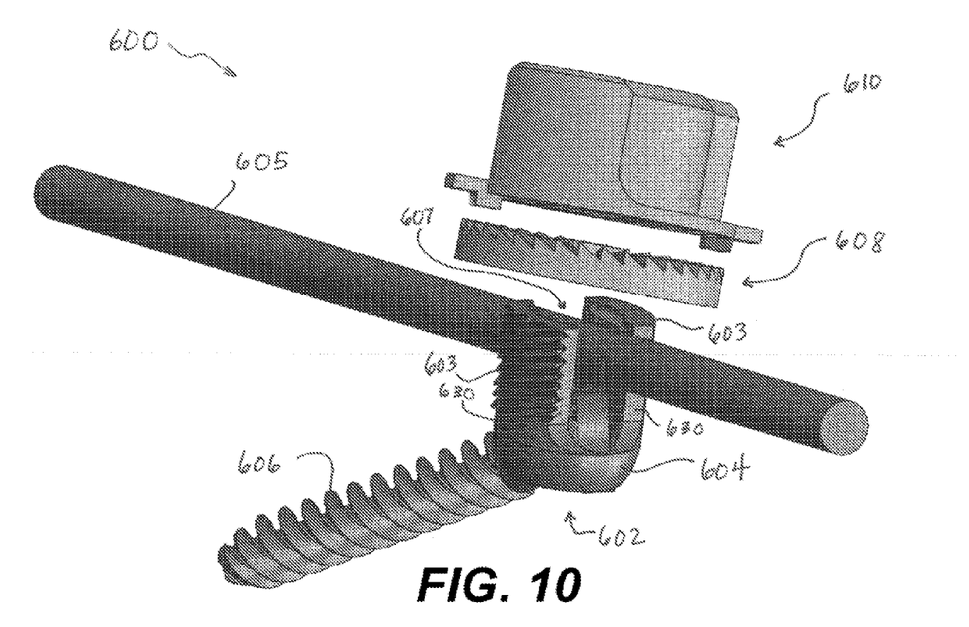
FIG. 10 is a partially exploded perspective view of a fixation system for coupling a rod to bone constructed in accordance with the subject technology, showing a fastener, a rod, a lock washer, and a threaded lock nut.

As shown in FIG. 10, a fixation system 600 for coupling a rod 605 to bone, for example a spinal pedicle screw rod system, includes an elongated bone screw fastener 602 with a threaded tulip head portion 604 defining a transverse channel 607 and opposing prongs 603, and an elongated threaded body portion 606 depending from tulip head portion 604. Fixation system 600 also includes a lock washer 608 and a threaded lock nut 610. Threaded lock nut 610 is substantially similar to lock nut 110 except that threaded lock nut 610 is configured to rotatably mate with tulip head portion 604, instead of threaded body portion 606.

Figure 11:
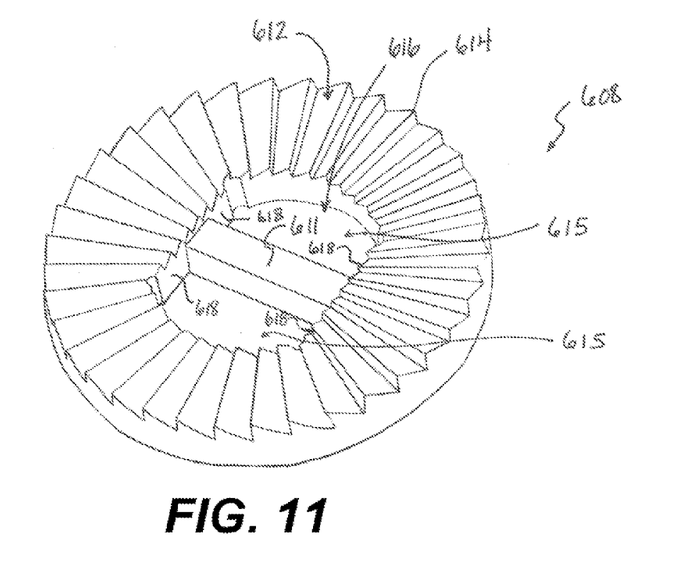
FIG. 11 is a perspective view of the lock washer of FIG. 9, showing an axial aperture with a bar defined therein, and a lower surface of the lock washer having ratchet teeth.

With reference now to FIGS. 10 and 11, lock washer 608 is similar to lock washer 108 except that lock washer 608 includes a bar 611 defined within an axial aperture 616 and lock washer 608 is configured for axial movement along tulip head portion 604, instead of a threaded body portion. Bar 611 extends between opposing sides of axial aperture 616 to create two discrete axial apertures 615. Each discrete axial aperture 615 includes a pair of opposing flat inner surfaces 618 corresponding to a pair of opposing longitudinally extending flat sections 630 of each prong 603. Flat sections 630 of each prong 603 are configured to mate with respective flat inner surfaces 618 of each discrete axial aperture 615 to rotationally fix lock washer 608 when prongs 603 of tulip head portion 604 are inserted in their respective discrete axial apertures 615, while allowing axial movement of lock washer 608 along the prongs 603 of tulip head portion 604 to secure rod 605 within the transverse channel 607 between lock washer 608 and tulip head portion 604. After rod 605 is placed within transverse channel 607, lock washer 608 is inserted over prongs 603 of tulip head portion 604. Bar 611 of lock washer 608 moves axially down transverse channel 607 and rests against rod 605.

Those skilled in the art will readily appreciate that because lock nut 610 and lock washer 608 are substantially similar to lock nut 110 and lock washer 108, a tool, e.g. tool 140 and/or tool 240, can be used to tighten rod 605 to the fastener 602 or remove rod 605 from fastener by either rotating lock nut 610 clockwise or counterclockwise. Traditional spinal pedicle screw rod systems tend to require a significant amount of torque to be applied, in order to lock a rod to a fastener, e.g. a pedicle screw, or to remove the rod from the fastener. Those skilled in the art will readily appreciate, however, that embodiments of the present invention reduce the amount of torque required as compared with traditional spinal pedicle screw rod systems.

Figure 12:
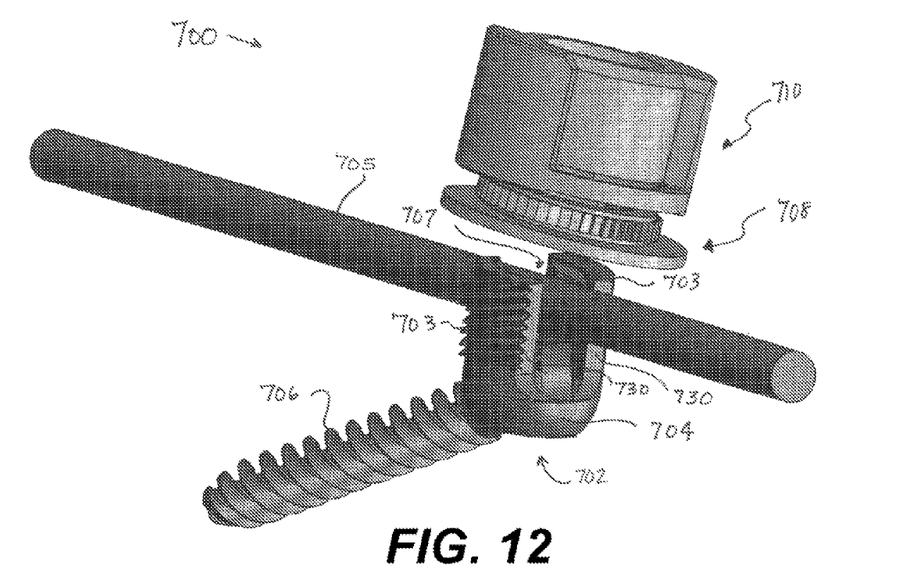
FIG. 12 is a partially exploded perspective view of another embodiment of a fixation system for coupling a rod to bone constructed in accordance with the subject technology, showing a fastener, a rod, a lock washer, and a threaded lock nut.

As shown in FIG. 12, a fixation system 700 for coupling a rod 705 to bone includes an elongated bone screw fastener 702 and rod 705, similar to bone screw fastener 602 and rod 605. Fixation system 700 also includes a lock washer 708 and a threaded lock nut 710. Threaded lock nut 710 is substantially similar to lock nut 410 except that threaded lock nut 710 is configured to rotatably mate with tulip head portion 704, instead of threaded body portion 706.

Figure 13:
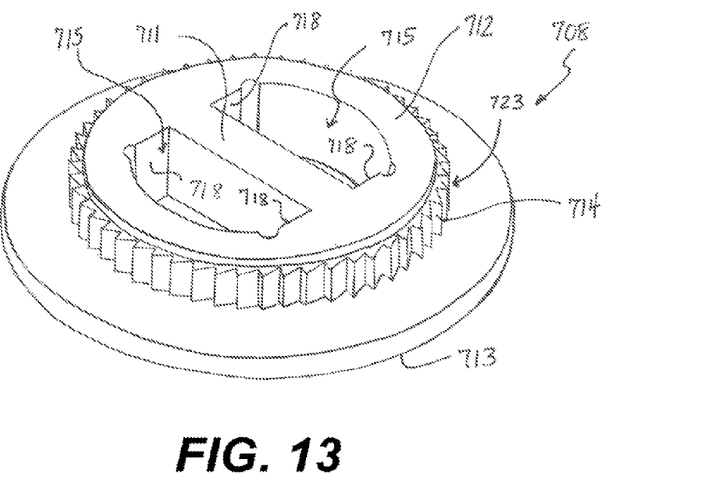
FIG. 13 is a perspective view of the lock washer of FIG. 11, showing an pair of discrete apertures with a bar defined therebetween, and a circumferential surface of the lock washer having ratchet teeth.

With reference now to FIGS. 12 and 13, lock washer 708 is similar to lock washer 408 except that lock washer 708 includes a pair of discrete axial apertures 715 and includes a bar 711 defined therebetween, and is configured for axial movement along tulip head portion 704, instead of a threaded body portion. Each discrete axial aperture 715 is configured to receive a respective prong 703 of tulip head portion 704 for axial movement of lock washer 708 along the prongs 703 to secure rod 705 between lock washer 708 and tulip head portion 704. Similar to lock washer 408, ratchet teeth 714 extend from a circumferential surface 723 radially outward of circumferential surface 723. Those skilled in the art will readily appreciate that because lock nut 710 and lock washer 708 are substantially similar to lock nut 410 and lock washer 408, a tool, e.g. tool 440, can be used to tighten rod 705 to the fastener 702 or remove rod 705 from fastener by either rotating lock nut 710 clockwise or counter-clockwise.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

The fastening device technology described herein has unlimited application in industry and other uses. Particularly advantageous applications will involve use near motors or moving equipment in which vibration may cause loosening of traditional fasteners such as in automotive applications, aerospace applications, oil and gas, and manufacturing machinery. The present fastening device technology is also well suited for medical applications such as attaching pedicle screws to spinal rods, attaching spinal plates and fracture plates, fixing artificial joints, like hips and knees, orthopedic and maxillofacial external fixator systems, and the like, in particular, those skilled in the art will readily appreciate that embodiments of the fastening device technology described herein can withstand high temperature applications, for example, they can withstand temperatures as high as the material they are fabricated from can tolerate, and are easily applied, removed and reused. In addition, it is contemplated that the tightening of a nut, e.g. locking nut 110, 210, 410, 610 or 710, on a fastener, e.g. fastener 102, 402, 602 or 702, can be blind. For example, instead of the head portions, e.g. head portions 104, 404, 604 and 704, fiats, e.g. flats 130, 430, 630 or 730 on body 106 can be held or otherwise fixed during tightening.

While the subject invention has been described with respect to preferred and exemplary embodiments, those skilled in the art will readily appreciate that various changes and/or modifications can be made to the invention without departing from the spirit or scope of the invention as described herein and as defined by the appended claims.

What is claimed is:

1. A fastening device comprising:
   a fastener having a head portion and an elongated threaded body portion extending axially from the head portion;
   a lock washer having opposed upper and lower surfaces and a circumferential surface therebetween, wherein the circumferential surface has an array of ratchet teeth extending radially outward of the circumferential surface, wherein the lock washer is configured to couple to the threaded body portion for axial movement but is fixed rotationally; and
   a threaded lock nut for rotatably mating with the threaded body portion, the threaded lock nut having opposed upper and lower surfaces and an outer surface therebetween, the upper surface defining a pawl arm, the outer surface having an axially extending recessed portion defined therein and extending between the lower surface and the pawl arm, wherein a tapered slot is defined between the pawl arm and the threaded lock nut in axial alignment with the axially extending recessed portion, the pawl arm including a pawl tooth for engagement with at least one ratchet tooth of the an array of ratchet teeth, wherein the pawl arm includes a tapered inner surface such that the tapered slot is smaller proximate the pawl tooth.

2. A fastening device as recited in claim 1, further comprising a tool for tightening and removing the fastener, the tool including a projection on a distal working portion, wherein the projection includes a recessed extension.

3. A fastening device as recited in claim 2, wherein the recessed extension is configured to engage the tapered slot defined between the pawl arm and the threaded lock nut.

4. A fastening device as recited in claim 2, wherein the projection corresponds to the axially extending recessed portion.

5. A fastening device as recited in claim 2, wherein the recessed extension corresponds to the tapered slot such that during tightening the recessed extension is in a larger portion of the tapered slot and during removal the recessed extension rotates counter-clockwise into a smaller portion of the tapered slot proximate the pawl tooth to splay the pawl arm radially outward.

6. A fastening device as recited in claim 1, wherein the lock washer defines an aperture, wherein a shape of a portion of the aperture is dissimilar to a shape of an adjacent portion of the aperture.

7. A fastening device as recited in claim 1, wherein the lock washer has an axial aperture having at least one flat inner surface corresponding to at least one longitudinally extending flat section of the threaded body portion, and wherein the elongated threaded body portion has a complimentary flat section for mating with the flat inner surface of the lock washer to rotationally fix the lock washer when the elongated threaded body portion is inserted in the axial aperture.

8. A fastening device comprising:
   a fastener having an axially extending elongated threaded body portion;
   a lock washer having an upper surface, an opposite lower surface, and a circumferential surface therebetween, the circumferential surface having an array of ratchet teeth extending radially therefrom, wherein the lock washer is configured to couple to the threaded body portion for axial movement but is fixed rotationally by the fastener;
   a threaded lock nut for rotatably mating with the threaded body portion, the threaded lock nut having an upper surface and an opposite lower surface, the upper surface defining a pawl arm, the pawl arm including a proximal end integrally coupled to the threaded lock nut, a flexible arm portion extending from the proximal end, a distal end extending from the flexible arm portion, and a pawl tooth disposed on the distal end for engagement with at least one tooth of the array of ratchet teeth as the flexible arm portion flexes relative thereto, wherein a tapered slot is defined between the flexible arm portion and the threaded lock nut; and
   a tool for tightening and removing the fastener, the tool including a projection on a distal working portion, wherein the projection includes a recessed extension.

9. A fastening device as recited in claim 8, wherein the lock washer defines an aperture, wherein a shape of a portion of the aperture is dissimilar to a shape of an adjacent portion of the aperture.

10. A fastening device as recited in claim 8, wherein the lock washer has an axial aperture having at least one flat inner surface corresponding to at least one longitudinally extending flat section of the threaded body portion, and wherein the elongated threaded body portion has a complimentary flat section for mating with the flat inner surface of the lock washer to rotationally fix the lock washer when the elongated threaded body portion is inserted in the axial aperture.

11. A fastening device as recited in claim 8, wherein the recessed extension is configured to engage the tapered slot defined between the flexible arm portion and the threaded lock nut.

12. A fastening device as recited in claim 8, wherein the projection corresponds to an axially extending recessed portion defined in an outer surface of the threaded lock nut between the lower surface of the threaded lock nut and the pawl arm.

13. A fastening device as recited in claim 8, wherein the flexible arm portion includes an inner surface that tapers radially inward such that the tapered slot has a smaller portion proximate the distal end and a larger portion proximate the proximal end, and wherein the recessed extension corresponds to the tapered slot such that during tightening the recessed extension is in the larger portion and during removal the recessed extension rotates counter-clockwise into the smaller portion to splay the pawl arm radially outward.

14. A fastening device comprising:
- a fastener having an axially extending elongated threaded body;
- a lock washer having a circumferential surface including an array of ratchet teeth extending radially therefrom, wherein the lock washer is configured to move axially along the threaded body portion while being fixed rotationally by the threaded body portion;
- a threaded lock nut comprising at least one pawl arm comprising a flexible arm portion having a proximal end coupled to the threaded lock nut and a distal end comprising a pawl tooth disposed thereon for engagement with at least one tooth of the array of ratchet teeth, wherein a tapered slot is defined between the flexible arm portion and the threaded lock nut; and
- a tool for tightening and removing the fastener, the tool including a projection on a distal working portion, wherein the projection includes a recessed extension.

15. A fastening device as recited in claim 14, wherein the lock washer defines an aperture, wherein a shape of a portion of the aperture is dissimilar to a shape of an adjacent portion of the aperture.

16. A fastening device as recited in claim 14, wherein the lock washer has an axial aperture having at least one flat inner surface corresponding to at least one longitudinally extending flat section of the threaded body portion, and wherein the elongated threaded body portion has a complimentary flat section for mating with the flat inner surface of the lock washer to rotationally fix the lock washer when the elongated threaded body portion is inserted in the axial aperture.

17. A fastening device as recited in claim 14, wherein the recessed extension is configured to engage the tapered slot defined between the flexible arm portion and the threaded lock nut.

18. A fastening device as recited in claim 14, wherein the projection corresponds to an axially extending recessed portion defined in an outer surface of the threaded lock nut between a lower surface of the threaded lock nut and the at least one pawl arm.

* * * * *